Figure 1:
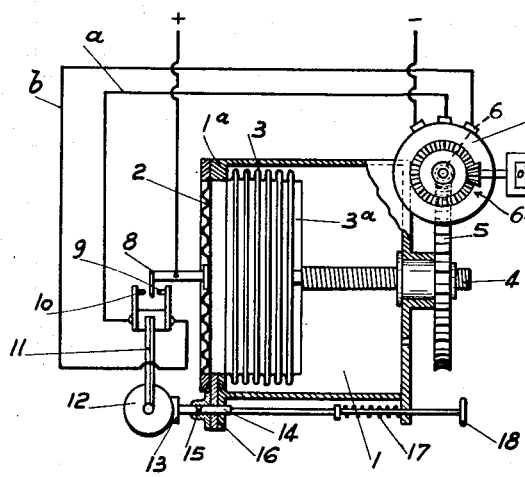

July 28, 1953

A. OVTSCHINNIKOFF 2,646,682

APPARATUS FOR DETERMINING EXTERNAL
PRESSURE AND ELEVATIONS

Filed Feb. 26, 1948

2 Sheets-Sheet 1

INVENTOR:
ALEXANDRE OVTSCHINNIKOFF

BY:

Patented July 28, 1953

2,646,682

UNITED STATES PATENT OFFICE 2,646,682

APPARATUS FOR DETERMINING EXTERNAL PRESSURE AND ELEVATIONS

Alexandre Ovtschinnikoff, Villeparisis, France

Application February 26, 1948, Serial No. 11,161
In France September 2, 1941

3 Claims. (Cl. 73—386)

This invention relates to apparatus of the aneroid diaphragm type for use in determining pressures and elevations.

In hitherto known apparatus of this type the difference of pressure between the inside of the aneroid capsule and the outside of the same causes the diaphragm to undergo a deflection which is mechanically transmitted directly to the reading means from which the difference of pressure may be read. In the course of time, however, the diaphragm grows weak and the accuracy of apparatus becomes impaired.

It is an object of the present invention to provide an improved apparatus of the aneroid diaphragm type which will permit of determining pressures and elevations with reliable accuracy even if the diaphragm grows weak.

According to one feature of the present invention there is provided a method of determining pressures and elevations with the aid of an aneroid of the diaphragm type, which comprises the steps of imparting to the diaphragm a deflection corresponding to the external pressure intended to be measured, causing said deflection to render effective an electric circuit to set in motion an electric motor interposed into said circuit, modifying through said motor the volume of aneroid capsule so as to counterbalance said external pressure and cause the diaphragm to return back to its neutral position, and transmitting the number of revolutions made by said motor for accomplishing such return of the diaphragm to reading means operatively connected with this motor.

According to a further feature of the present invention there is provided pressure and elevation measuring apparatus of the aneroid diaphragm type suitable for carrying out the above method, said apparatus comprising an aneroid capsule of variable volume, means whereby a deflection imparted to the diaphragm by the external pressure to be measured may render effective an electric circuit to set in motion an electric motor interposed into said circuit, means controlled by said motor and adapted to modify the volume of said aneroid capsule so as to counterbalance said external pressure and thereby bring the diaphragm back to its neutral position, and means whereby the number of revolutions made by said motor for accomplishing such return of the diaphragm may be transmitted to appropriate reading means operatively connected with this motor.

Other objects and features of the present invention will be apparent from the following description and appended claims.

Figure 2:
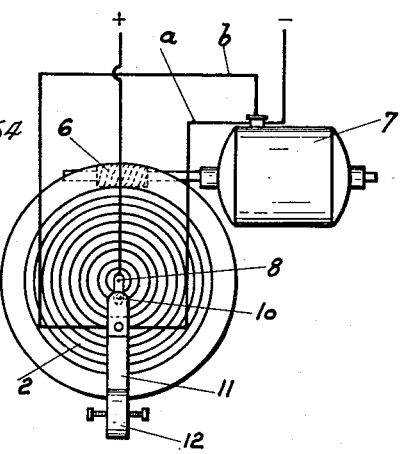
Figure 3:
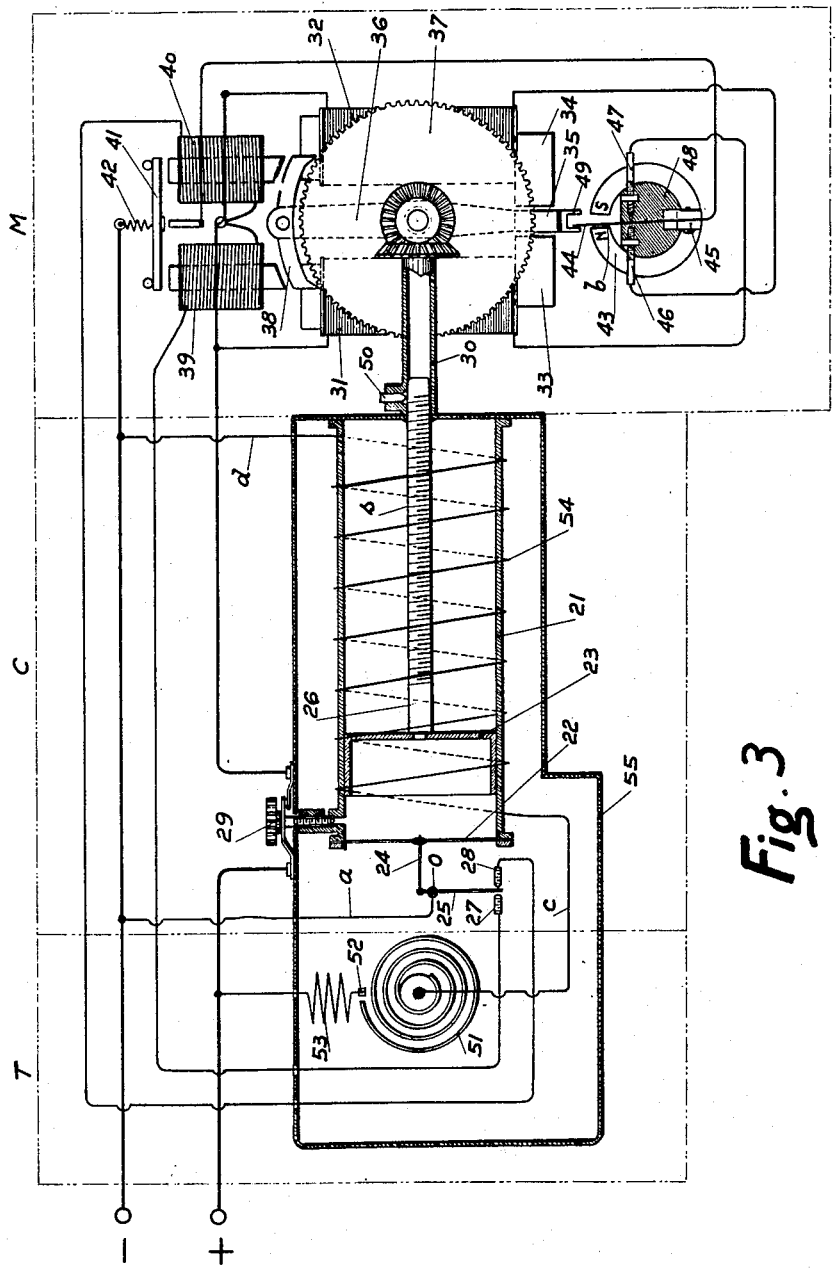

The invention will be described with reference to the accompanying diagrammatic and detailed drawings in which:

Fig. 1 is a diagrammatic elevational sectional view showing a form of pressure and elevation measuring apparatus according to the present invention, Fig. 2 is a front view corresponding to Fig. 1, and Fig. 3 is a diagrammatic view showing a further form of pressure and elevation measuring apparatus according to the invention, Referring to Figs. 1 and 2, the pressure measuring apparatus comprises in a casing 1 an aneroid capsule constituted by a diaphragm 2, part 1a of said casing and bellows 3. Supporting the bellows 3 is a plate 3a into which is centrally engaged one end of a screw-threaded rod 4 the other end of which is engaged into a nut belonging to a toothed wheel 5 supported by a bearing belonging to the casing 1, the arrangement being such that when the wheel 5 is caused to rotate the screw-threaded rod 4 receives a motion of translation, compressing or expanding the bellows 3.

The wheel 5, for example, is in mesh with a worm 6 carried by the shaft of a reversible electric motor 7 of any convenient construction, having, for example, two inducing coils wound in opposite senses, one of which is connected to the wire $a$ and the other to the wire $b$, and both being connected to the negative terminal of the source of electric current employed.

The diaphragm 2 is provided with a central rod 8 electrically connected to the positive terminal of the source of current. The rod 8 carries a contactor positioned between two stationary contacts 9 and 10. When the external pressure is balanced by the internal pressure (in the aneroid capsule), said contactor is held in inoperative position in relation to the contacts 9 and 10. The contact 9 is electrically connected to the wire $b$ and the contact 10 to the wire $a$.

The contacts 9, 10 are supported preferably by a thermostatic device 11, which may be constituted for example by a bimetallic stem, to provide a correction for temperature, as will be explained later on. The bimetallic stem 11 is mounted on a rotatable disk 12 controllable by a brake block 13. The latter belongs to a rod 14 having a radial hole 15a which together with a fitting 16 having an inlet passage 16a therethrough forms a valve that may connect the aneroid capsule with the external space. A spring 17 yieldably holds the ensemble in a position such that the brake block 13 applies against the disk 12 and immobilizes the same, while the rod 14 obturates the fitting 16; but when the button is pulled, the spring 17 is compressed and, consequently, the disk 12 is released and the valve 15—16 is opened.

The operation of the apparatus is as follows:

If the external pressure is decreased with respect to the pressure prevailing in the aneroid capsule, the diaphragm 2 deflects outward and contactor of rod 8 comes in contact with the stationary contact member 10, whereby an electrical circuit is completed through wire $a$ and the motor circuit is made effective for a certain direction of rotation. This direction is the one that corresponds to the translation of the screw-threaded rod 4 and plate 3$a$ to the right, as viewed in Fig. 1. It results therefrom that the bellows 3 expand and increase the volume of the aneroid capsule until the pressure therein becomes equal to the external pressure, whereupon the diaphragm 2 and the intermediate contact carried by it come back to their neutral positions, thereby cutting off the motor circuit and stopping the motor. The number of revolutions made in the meantime by the motor will correspond to the difference of pressures with respect to the initial pressure and will be read off from a counter 64 the shaft of which is connected by a gear 64' to the shaft of the motor 7 as diagrammatically shown in Fig. 1, shown at 60 in Figs. 4 and 9.

If the external pressure, instead of decreasing, were increasing, then the diaphragm 2 would be deformed in such a way as to cause the intermediate contactor carried by the rod 8 to come in contact with the stationary contact member 9. An electrical circuit is completed through wire $b$ and the motor would rotate in the direction opposite to the previous one. The screw-threaded rod 4 would then cause a contraction of the bellows 3 and, consequently, an increase of pressure until the contactor carried by the rod 8 would leave the stationary contact member 9.

Where the surrounding temperature varies, the expansion of the gas confined in the aneroid capsule would lead into error, since the pressure therein would increase and the system described would operate even though the external pressure did not change. To avoid this error, use is made according to the invention of a thermostatic control constituted for example by a bimetallic stem 11. When the temperature rises and the diaphragm tends to bulge because of this rise of internal pressure, the stem 11 tends to displace the contacts 9 and 10 to the left, as viewed in Fig. 1, in order to make up for the motion of the rod 8 and its contactor effected in the same sense. Similarly, when the temperature tends to decrease, the contacts 9 and 10 are automatically displaced to the right so as to make up for the contraction of the diaphragm 2 due to the decrease of pressure in the aneroid capsule.

The apparatus thus constituted is applicable in pressure measurements, but can also be used as altimeter for determining elevations. In the latter case, means have been provided for initial adjustment which consists in subjecting the inside of the aneroid capsule to the pressure prevailing at the aerodrome of departure, and adjusting the contacts 9 and 10 so that at this pressure they do not touch the contactor carried by the rod 8. To this end, it will suffice to pull the control button 18 against the action of the spring 17. The hole 15 will then face the hole of the fitting 16, whereby the aneroid capsule will be set in communication with the outside. At the same time, the brake block 13 will be removed from the disk 12, so as to thereby permit the contacts 9 and 10 to be set in their neutral positions.

Instead of bellows 3, use may be made of a piston tightly slidable in a cylinder terminated by the diaphragm facing this piston. This arrangement is illustrated in Fig. 3.

The said cylinder is designated by 21, the diaphragm by 22 and the piston by 23. The diaphragm 22 is connected by means of a rod 24 with a lever 25 pivoting at O. Rigid with the piston 23 is a piston rod 26 which is screw-threaded with variable pitch $s$ for the purpose that will be explained later on. This portion of the apparatus is denoted in the drawing (Fig. 3) by the reference character C.

The rod 25 serves as movable contactor for stationary contacts 27, 28 and is connected by a lead $a$ with the negative bus-bar of the current distributing system. When the diaphragm is in its neutral position the members 25, 27, 28 remain out of contact.

The aneroid capsule defined by the diaphragm 22 and the piston 23 is provided with a needle valve 29 for setting the capsule in communication with the atmosphere. When opened the valve 29 cuts off the electric current coming from the positive bus-bar to a servomotor controlling the operation of the whole apparatus and designated in the drawing (Fig. 3) by the reference character M.

The servomotor M, which drives a hollow shaft 30, is constituted by two pairs of electromagnets 31, 32. Between the magnetic poles 33, 34 of these electromagnets there is provided an armature 35 secured to a lever 36. The lever 36 is mounted on the shaft of a toothed wheel 37 and provided with a double-acting pawl 38. The ends of the pawl 38 are acted upon by the magnetic field of two electromagnets 39, 40 adapted to start the motor and change the sense of rotation of its shaft, i. e. to the right or to the left, as viewed in Fig. 3. An armature 41 supported by a spring 42 is attracted toward the core of one or the other of the two windings 39, 40, depending on whichever winding is energised, and sets electromagnets 31, 32 in circuit with the negative bus-bar of the current distributing system.

The operation of the motor is based on a periodical oscillation of the armature 35 between the poles 33, 34 of electromagnets 31, 32. The amplitude of this oscillation slightly exceeds the pitch of the toothed wheel 37 which may have for example 200 teeth. The said amplitude is obtained with the aid of a relay comprising an annular permanent magnet 43 between the magnetic poles of which there is provided a resilient plate or tongue 44 one end of which is secured to a bracket 45, while at its other end it is attracted by one of the poles of magnet 43 and pressed against one of the two electric contacts 46, 47 secured to an insulating member 48. The lower end of the plate 44 is connected by a lead with a contact member provided on the armature 41. The contacts 46, 47 are connected with electromagnets 31, 32, respectively. The free end of lever 36 carries a fork 49 the gap of which is slightly inferior to the pitch of toothed wheel 37. When the current passes through the contact 46 into the electromagnet 32, and rotates the toothed wheel 37 by means of the double-acting pawl 38 one end of which is pressed against the teeth of the wheel by the magnetic field of the core of electromagnet 40, the wheel 37 is moved (together with the shaft 30) through an angle corresponding to the wheel pitch. During this motion and the last phase of oscillation of the armature 35, while this is attracted by the pole 34 with greatest force (following the law of electromagnetic attraction the strength of which is inversely proportional to the square of distance between the armature and the pole), the fork 49 is applied against the free end of the plate 44 and bends it out into a position in which the forces of attraction of the opposite poles of magnet 43 are balanced. Such bending results from that the plate 44 keeps on being applied against the contact 46 by the force of magnetic attraction of the pole N at the point b, this point remaining a very small distance apart from the plate 44. When the end of plate 44 is sufficiently bent toward the position in which the magnetic attraction of the poles N and S counterbalances the resilient force of the plate, the latter is abruptly thrown out of contact with the contact 46. The plate 44 is thereby moved into the magnetic field of the pole S by which it is attracted so as to render effective the circuit through the contact 47 whereby the current passes into the winding of the electromagnet 31 and causes a reverse displacement of the armature 35 in a manner similar to that just described. In this way, the armature 35 undergoes a periodical oscillation between the poles 33, 34 of electromagnets 31, 32. During this oscillation the amplitude is limited, for instance by stops (not shown) for permitting the double-acting pawl to pass from one tooth of wheel 37 to another.

In the above described operation of the motor M all forces acting upon the armature 35 during each cycle of its oscillation and necessary for causing the rotation of the toothed wheel 37 and the shaft connected with it are proportional to the increase of the force of magnetic attraction of the armature 35 by the poles 33, 34 in accordance with its motion toward one or the other of the poles during each cycle of oscillation. The force of this attraction increases in an inverse proportion to the square of the distance between the armature and the pole of the electromagnet during the motion of the armature between the poles. The armature 35 moves the tongue 44 out of contact with the poles of the magnet 43 only during the last quarter of the amplitude of oscillation of the armature 35, because (Fig. 3) the tongue 44 is disposed with the free end thereof between the legs of the fork 49 connected to the free end of wire 36 connected to armature 35, which has undergone a certain displacement during which the tongue 44 is at rest between the legs of fork 44, for instance, a displacement corresponding to ¾ of the total angular displacement of the armature 35. Therefore the armature 35 is at the shortest distance from one or the other of the poles of electromagnets 31, 32, whereby a uniform repetition of the above described cycle of operation of the motor is obtained until the contact 25 is restored to a neutral position.

The change of the sense of rotation of the toothed wheel 37 and the shaft 30 connected with it is obtained by means of electromagnets 39, 40 which are set in operation alternately, depending on whichever of the contacts 27, 28 is set in contact with the end of lever 25. When the current passes through one of the electromagnets 39 or 40, one or the other end of the double-acting pawl 38 is, under the action of the corresponding magnet core, pressed against the teeth of wheel 37 so as to thereby impart to the wheel a right-hand or left-hand rotation, as viewed in Fig. 3. At the same time the armature 41 is attracted towards one of the cores of electromagnets 39 or 40 and sets the motor into the circuit, as previously.

In a general way, each cycle of oscillation of the armature 35 causes the toothed wheel 37 to rotate in one direction or the other through an angle corresponding to one tooth.

The operation of the apparatus as hereinabove described is as follows: The initial air charge confined in the aneroid capsule defined by the diaphragm 22 and piston 23 expands when the aircraft equipped with the apparatus climbs up, and this expansion causes the diaphragm 22 to bulge outwards, whereby the rod 24 rigid with the diaphragm 22 causes the contact lever 25 to pivot about the point O into contact with the stationary contact 28 so as to thereby render effective the electric circuit passing through the electromagnet 40. The latter attracts the armature 41 and a corresponding end of the double pawl 38, setting in operation the motor M as stated hereinabove. The motor M rotates the hollow shaft 30 which causes the screw-threaded piston rod 26 to slide into it without rotating by means of a pin 50, grooved rod 26a and key 26b secured to the piston rod 26 and sliding in the groove 26b, the rod 26a being secured to the apparatus shell and concentric with the shaft 30. This sliding displacement of the screw-threaded piston rod 26 and hence of the piston 23 itself has for its effect to increase the volume of the aneroid capsule until the pressure in it counterbalances the external pressure. As soon as this is attained, the diaphragm 22 comes back to its neutral position and throws the lever 25 out of contact with the stationary contact 28, whereby the operation of the motor M is instantaneously interrupted.

Since the external atmospheric pressure is not a linear function of the altitude but is a curvilinear one, that is to say that its graph in rectangular co-ordinates is an ascending curve, it is necessary for obtaining maximum accuracy of the apparatus to cause the piston rod 26 to displace the piston 23 through distances progressively greater than those corresponding to said linear function, as altitudes are increasing, and progressively shorter as altitudes are decreasing. This is accomplished by providing the screw-threaded piston rod 26 with varying pitch S, as is clearly shown in Fig. 3, so that the stroke of piston 23 corresponding to said return of the diaphragm 22 to its neutral position is exactly proportional to the difference of pressure that has occurred between the inside of the capsule and the external atmosphere. This stroke may be readily determined from the following formulae:

$$V_I = Vp/p_I \times (I+kt_I)/(I+kt) \qquad (1)$$
$$\pi d^2 l/4 = V_I \qquad (2)$$

where: $V_I$=increase or decrease in the volume of the capsule effected by the stroke, $p_I$=pressure corresponding to $V_I$, $V$=initial volume of the capsule, $p$=pressure corresponding to $V$, $k$=coefficient of expansion of the air for a rise of temperature of 1° centigrade, $t_I$=temperature in degrees centigrade corresponding to $V_I$ and $p_I$, $t$=temperature in degrees centigrade corresponding to $V$ and $p$, $d$=diameter of the cylinder 21, and $l$=length of the stroke.

In these conditions, the length of stroke $l$ is instrumental in measuring the corresponding external pressure.

The great advantage of the screw-threaded rod 26 with varying pitch S, as hereinabove described, is that it permits of doing away with delicate and complicated system of levers and gears usually provided in heretofore altimeters for transforming irregular modifications in the volume of an aneroid capsule, due to the aforesaid curvilinear function, into uniform indications on the reading means.

To counteract the influence of temperatures (see Formula 1) there are provided thermostatic means, designated in Fig. 3 by the reference character T, for maintaining a constant temperature of the air within the cylinder 21. This thermostatic equipment of the apparatus is necessary for obtaining accurate operation of the whole apparatus, for without this equipment the temperature of the air within the cylinder 21, if not maintained constant, would cause compression and expansion of the air in the cylinder independently of variations of atmospheric pressures.

Said thermostatic equipment comprises a bimetallic spiral band 51 interposed into the electric circuit passing from the bus-bar of positive polarity, through a heater 53, contact 52, band 51, lead c and heating coil 54 encompassing the cylinder 21, to the bus-bar of negative polarity. When the air in the cylinder 21 and outer casing 55 is heated up to $+50°$ C., the bimetallic band 51 partly unwinds itself and moves away from the contact 52. If this temperature falls below $+50°$ C. the band 51 moves back and touches the contact 52 so that the whole apparatus is heated again. In this way, the temperature is kept constant within the limits of $\pm 0.2$ degree centigrade. In order to permit a gradual heating of the air within the housing 55 and to accelerate the reaction of the band 51, there is provided an additional heater 53 the heating surface of which is so proportioned as to heat the air within the portion of housing around the band 51 to the same extent as the air is heated around the cylinder 21 by the heating coil 54. To this end, the volume of air in these two portions of housing 55 and the external cooling surface of these two portions of housing are so proportioned as to allow the air in the whole volume of the housing to be uniformly heated.

In order to increase the sensitiveness of the contact 52 and prevent the bimetallic band 51 from being deformed by cooling below $+50°$ C., the contact 52 and the free end of the band 51 are mounted on two levers 56, 57 pivoted to a shaft 58. The lever 56 that carries the contact 52 is pressed against the contact of band 51 provided at the end of lever 57 by means of a spiral spring 58a. When the band 51 contracts, the lever 57 connected to the inner end thereof secured to a roller 59 presses against the contact 52 carried by the lever 56 and moves the latter against the action of a weak spring 58a, whereby the band 51 is prevented from being deformed.

What is claimed is:

1. An apparatus for determining external pressures and elevations comprising in combination, a frame; a capsule of variable volume supported by said frame and including a diaphragm, a cylinder, and a piston displaceable in said cylinder, said diaphragm being adapted to be deflected from the neutral position thereof by the external pressure; a reversible electric motor mounted in said frame and having two windings adapted to drive said motor in opposite directions, respectively; a first stationary contact member connected to one of said windings; a second stationary contact member connected to the other of said windings; a movable contact rigidly connected to said diaphragm and adapted to make contact with one of said stationary contact members when said diaphragm is deflected by the external pressure; a gearing actuated by said motor; a screw-threaded rod having one end rigidly connected to said piston and the other end engaging said gearing for translatory motion of said rod, said rod displacing said piston so as to modify the volume of said capsule so as to equalize the internal pressure in said capsule and the external pressure exerted on the same, thereby causing said diaphragm, when in contact with one of said contact members, to return to the neutral position thereof; means for ascertaining the sense and amount of rotation of said motor required for causing said piston to be displaced into pressure equalizing position; and thermostatic means for maintaining a constant temperature of the air in and around said cylinder, said thermostatic means including a feeding circuit, a preheater inserted in said feeding circuit and adapted to heat one end portion of the apparatus, a heating coil surrounding said cylinder, and a bimetallic spiral coil for controlling said preheater and said heating coil.

2. An apparatus for determining external pressure and elevations comprising in combination, a frame; a capsule of variable volume supported by said frame and including a diaphragm, a cylinder, and a piston displaceable in said cylinder, said diaphragm being adapted to be deflected from the neutral position thereof by the external pressure; a reversible electric motor mounted in said frame and having two windings adapted to drive said motor in opposite directions, respectively; a first stationary contact member connected to one of said windings; a second stationary contact member connected to the other of said windings; a moveable contact rigidly connected to said diaphragm and adapted to make contact with one of said stationary contact members when said diaphragm is deflected by the external pressure; a gearing actuated by said motor; a screw-threaded rod of progressively varying pitch having one end rigidly connected to said piston and the other end engaging said gearing for translatory motion of said rod, said rod displacing said piston so as to modify the volume of said capsule so as to equalize the internal pressure in said capsule and the external pressure exerted on the same, thereby causing said diaphragm, when in contact with one of said contact members, to return to the neutral position thereof; and means for ascertaining the sense and amount of rotation of said motor required for causing said piston to be displaced into pressure equalizing position.

3. An apparatus for determining external pressure and elevations comprising in combination, a frame; a capsule of variable volume supported by said frame and including a diaphragm, a cylinder, and a piston displaceable in said cylinder, said diaphragm being adapted to be deflected from the neutral position thereof by the external pressure; a reversible electric motor mounted in said frame and having two windings adapted to drive said motor in opposite directions, respectively; a first stationary contact member connected to one of said windings; a second stationary contact member connected to the other of said windings; a moveable contact rigidly connected to said diaphragm and adapted to make contact with one of said stationary contact members when said diaphragm is deflected by the external pressure; a gearing actuated by said motor; a screw-threaded rod of progressively varying pitch having one end rigidly connected to said piston and the other end engaging said gearing for translatory motion of said rod, said rod displacing said piston so as to modify the volume of said capsule so as to equalize the internal pressure in said capsule and the external pressure exerted on the same, thereby causing said diaphragm, when in contact with one of said contact members, to return to the neutral position thereof; means for ascertaining the sense and amount of rotation of said motor required for causing said piston to be displaced into pressure equalizing position; and thermostatic means for maintaining a constant temperature of the air in and around said cylinder, said thermostatic means including a feeding circuit, a pre-heater inserted in said feeding circuit and adapted to heat one end portion of the apparatus, a heating coil surrounding said cylinder, and a bimetallic spiral coil for controlling said preheater and said heating coil.

ALEXANDRE OVTSCHINNIKOFF.

References Cited in the file of this patent

UNITED STATES PATENTS

| Number | Name | Date |
|---|---|---|
| 1,681,309 | Paulin | Aug. 21, 1928 |
| 2,041,028 | Stanley | May 19, 1936 |
| 2,178,027 | Wright et al. | Oct. 31, 1939 |

FOREIGN PATENTS

| Number | Country | Date |
|---|---|---|
| 375,676 | Germany | May 17, 1923 |
| 248,384 | Great Britain | May 25, 1927 |
| 454,443 | Great Britain | Oct. 1, 1936 |
| 509,906 | Great Britain | July 24, 1939 |
| 699,053 | Germany | Nov. 21, 1940 |
| 878,475 | France | Oct. 12, 1942 |